United States Patent [19]

Biegel et al.

[11] Patent Number: 4,823,600
[45] Date of Patent: Apr. 25, 1989

[54] ULTRASONIC TRANSDUCER AND CURRENT LOOP TRANSMITTER

[75] Inventors: Michael Biegel, Warwick; Mark Goodman, Peekskill, both of N.Y.

[73] Assignee: UE Systems, Inc., N.Y.

[21] Appl. No.: 118,221

[22] Filed: Nov. 5, 1987

[51] Int. Cl.⁴ ............................................. G01N 29/04
[52] U.S. Cl. ................................... 73/592; 73/40.5 A
[58] Field of Search ..................... 73/40.5 A, 592, 593, 73/594, 290 V, 900, 647; 340/531, 533, 621

[56] References Cited

U.S. PATENT DOCUMENTS 4,528,852  7/1985  Söhoel ..................................... 73/593
4,700,569 10/1987  Michalski et al. ................. 73/290 V Primary Examiner—Stephen J. Levy
Assistant Examiner—Louis M. Arana
Attorney, Agent, or Firm—Darby & Darby

[57] ABSTRACT

Ultrasonic vibrations indicating trouble at remote locations are detected by sensors spaced in the vinicity of expected trouble. These sensors have weather resistant transducers that convert ultrasonic vibrations from a leak in a conduit, electrical arc, bearing vibration or the like, into an electrical signal. In the sensor there are circuits that amplify the electrical signal and transmit it with a current loop transmission system over a twisted pair of wires to a central control and analysis computer. The amplification of the signal at the sensor is controlled by a signal from the center computer which changes the gain increments until the sensor circuits are not saturated by the ultrasonic signal. This gain control signal is also delivered to the sensors over a twisted pair of wires by current loop transmission system.

22 Claims, 7 Drawing Sheets

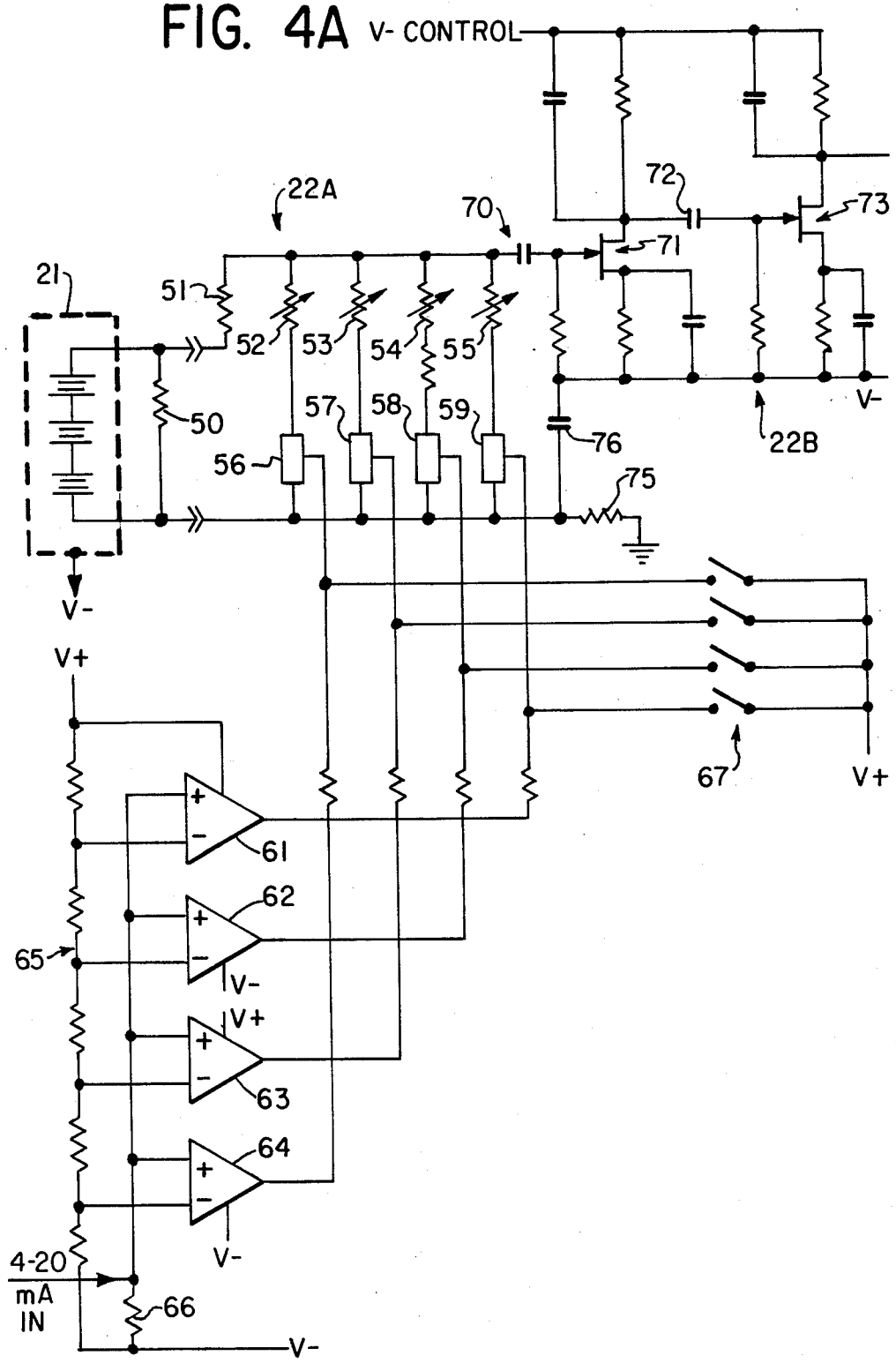

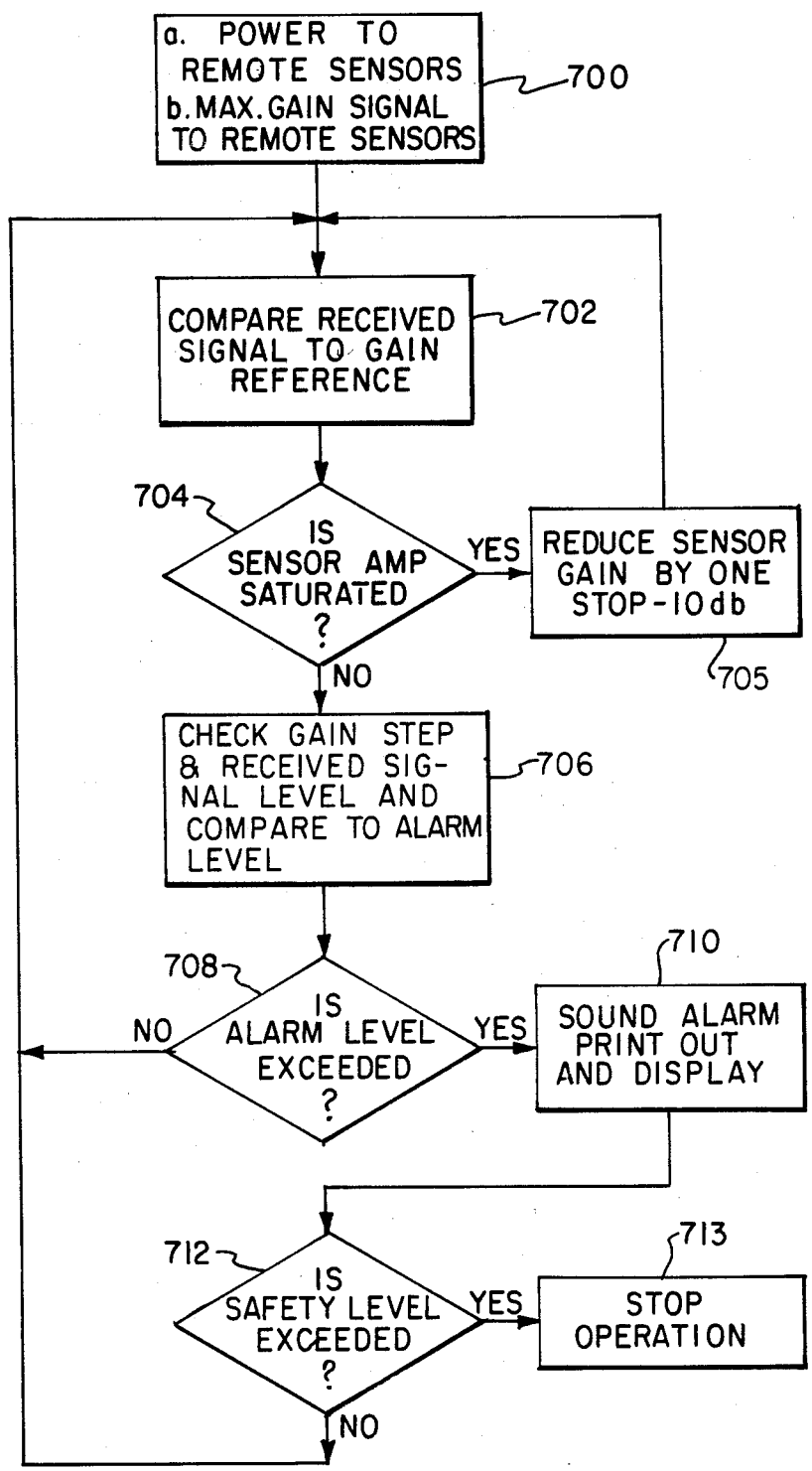

ULTRASONIC TRANSDUCER AND CURRENT LOOP TRANSMITTER

TECHNICAL FIELD

This invention relates to ultrasonic apparatus and, more particularly, to apparatus for the remote sensing of leaks in pressurized systems through the detection of ultrasonic vibrations.

BACKGROUND ART

When a system of conduits is operated under positive or negative pressure, leaks in the conduits create acoustic vibrations in the ultrasonic range, i.e. between 20 KHZ and 100 KHZ. It is known that these leaks can be detected with ultrasonic transducers. For example, U.S. Pat. No. 4,416,145 of Goodman et al., which is owned by the assignee of the present invention, describes apparatus for detecting such leaks.

The ultrasonic vibrations produced by a leak are directional and are typically detected by passing a detector unit about the system of conduits. This unit has a highly directional transducer and a preamplifier so that the location and intensity of even small leaks is easily determined. Also the ultrasonic frequency of the leak is usually outside the frequency range of ambient noise so that the signal from a leak can be separated from most of the competing noise by selective filtering.

One problem with prior ultrasonic detectors is that the preamplifiers must have a very wide dynamic range in order to detect small leaks without becoming saturated by sound from large leaks. When the ultrasonic detector is carried about in a search for leaks, the operator can manually change the dynamic range in order to measure the intensity of sound from both large and small leaks.

In some situations continuous monitoring of the integrity of a conduit system is important, and even critical e.g. in a chemical plant where hazardous gases are created or used. Since it would be impractical to have an operator standing at critical points waiting for months or years to detect a leak that may never come, it would be advantageous to have remote ultrasonic detectors located at various critical points in the system and to have the signals from these detectors delivered to a central control device. This central control device may be under direct operator supervision or under computer control.

In industrial environments where remote ultrasonic detection may be advantageous, there are likely to be strong electrostatic and electromagnetic signals which can interfere with control signals to the detectors and measured signals from the detectors. Since it is also likely that there will be great distances between the measurement locations and the central control location, the transmission system must have a high immunity to interference. Further, the cables should be inexpensive in order to keep the cost of the overall ultrasonic detector system to a minimum.

A standard means of providing low cost immune transmission is the so-called "current loop." In such a system, analog as well as digital signals are transmitted as current signals, as opposed to voltage signals. Industry standards specify ranges of 4–20 milliamps or 10–50 milliamps from zero to full scale for such a system.

It may be necessary to locate remote transducers in harsh environments, even out of doors. Thus, it would be advantageous if the transducer could be made resistant to adverse water, wind and temperature conditions, without seriously degrading its ability to detect ultrasonic vibrations.

DISCLOSURE OF THE INVENTION

The present invention is directed to a weather or environment resistant, remote ultrasonic detection system utilizing current loop transmission principles.

In an illustrative embodiment of the invention, an ultrasonic transducer is utilized which has a series connection of three crystal detectors, as shown in the previously mentioned patent to Goodman et al. Such a detector is enclosed in a weather resistant or environment resistant cylinder which is open in one axial direction. The three crystals are aligned for maximum sensitivity along this axis and a Mylar cover is located over the opening to keep out moisture. In addition a wire screen is located over the Mylar cover to protect it from physical damage.

The environment resistant transducer is connected to a preamplifier which is housed in a weather or environment resistant container. Such transducer equipped containers or remote sensors are located at critical points in an industrial plant where leaks in fluid conduits are likely to occur, or where a leak would be crucial to the operation or safety of the plant. These remote sensors are connected to a central control and analysis device by a current loop transmission system which utilizes twisted pairs of wires. Part of the current loop circuit is in each remote sensor and part is at the central unit.

The preamplifier in the remote sensor has its gain changed in fixed increments under the direction of the central control apparatus. Ordinarily, the preamplifier will be at its highest gain, so it may detect the smallest leak. However, when the central control apparatus detects that the dynamic range of the preamplifier has been exceeded because of the intensity of the ultrasonic signal being detected from a large leak or the close physical proximity of the detector to the leak. The central control apparatus incrementally lowers the gain until the signal falls within the dynamic range of the preamplifier. In this way, both large and small leaks, and leaks at varying distances, may be detected and measured remotely, without operator involvement.

The control apparatus may merely indicate the existence of a leak and its amplitude, where the amplitude is a function of the signal received over the current loop and the incremental gain set in the preamplifier by the central control apparatus. In such a case a warning would be provided to an operator. However, if desired, the central control apparatus, which may be a computer, can exercise control over the plant and take steps to avoid possible dangers. For example, the central control apparatus can automatically open or close critical valves or even shut down the plant operation.

BRIEF DESCRIPTION OF THE DRAWINGS

The foregoing and other features of the present invention will be more readily apparent from the following detailed description and drawings of illustrative embodiments of the invention in which:

FIGS. 4A, 4B and 4C form a schematic diagram of the electronic circuit at the remote sensor;

FIG. 7 is a flow chart of the operation of central control and analysis apparatus.

DESCRIPTION OF ILLUSTRATIVE EMBODIMENTS

Figure 1:
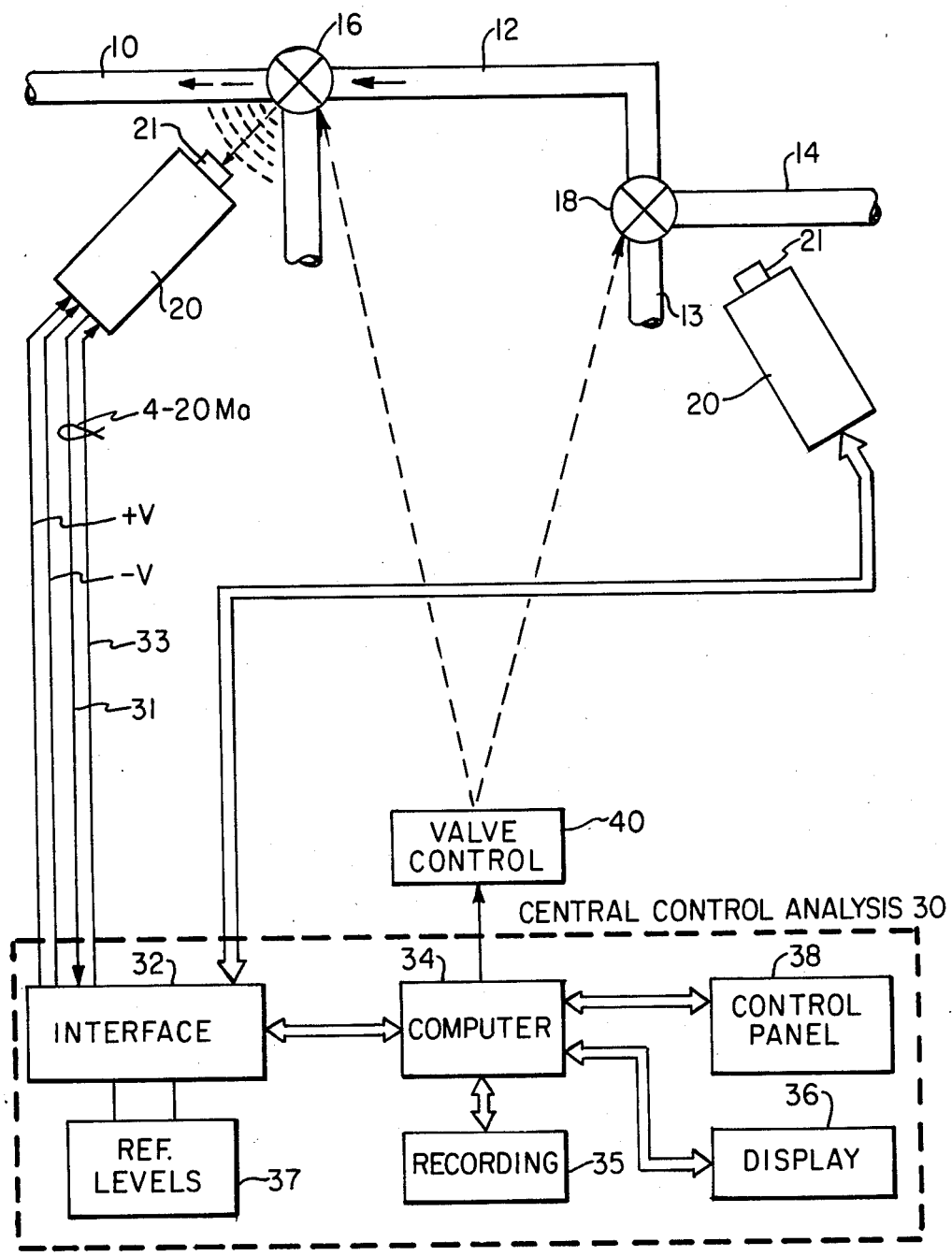
FIG. 1 is a block diagram of a remote ultrasonic leak detecting system according to the present invention.

In FIG. 1 there is shown a ultrasonic leak detector system utilizing remote sensors 20 distributed throughout an industrial plant. In particular, conduits 10–14 of a plant are interconnected by valves 16, 18. These conduits typically carry a fluid, e.g. gas, under pressure. It is not uncommon for thousands of feet of such conduits to be distributed over a plant area, which area may itself be thousands of feet in length and/or width. If the gas itself is toxic, it would be an important safety feature of the plant to be able to detect the leakage of this gas at critical points along the conduits. This is especially true if the gas is odorless and colorless. Even if the gas is not hazardous itself, the escape of such gas may be an indication of an impending hazardous condition, for example where the gas is used as part of a cooling system.

In order to allow continuous monitoring of the conduits for possible leaks, the present invention proposes that remote sensors 20 be positioned along the conduits, preferably at sensitive locations such as bends or valves, where the gas pressure is likely to exert the most stress on the conduits. Each of the remote sensors 20 is equipped with an ultrasonic transducer 21 which is capable of converting the ultrasonic sound, which is generated by the escape of fluid through an opening or leak, into an electrial signal for transmission to a central control and analysis apparatus 30.

As shown in FIG. 1 the sensors employ acoustic transducers which pick up the ultrasonic sound created when the pressurized fluid passes through a leak. However, a contact transducer, which is directly attached to the conduit and senses its vibrations, may also be used. Further the sensor may be used to detect problem conditions other than leaking conduits, so long as they generate ultrasonic vibrations, e.g. electrical arcing and worn bearings.

The connection between the remote sensors 20 and the central control apparatus 30 comprises four wires, i.e. two pairs of twisted wires. One of the pairs of wires supplies plus (+) and minus (−) voltage to the remote sensor from the sensor unit. The other pair lines 31, 33 provides a current loop transmission system, preferably of the 4–20 milliamp variety, using the minus voltage line as a return. Despite the electromagnetic fields and other interference which may be found in an industrial setting, satisfactory operation of the remote sensors can be achieved using twisted pairs of wires extending up to 2,000 feet in length.

In operation, the central control and analysis apparatus 30 supplies power to the remote sensors and also control signals over lines 33 which set the gain levels in the sensors. Typically this gain is set at the maximum step allowable, such that the smallest possible leak can be detected early. A return line 31 of the current loop transmission system provides a signal to the central control and analysis circuit 30 which represents the amplitude of any leak which has been detected. If a small leak is detected, for example at the connection of conduit 10 to valve 16, the flow of gas through the leak will produce ultrasonic sound which is detected by transducer 21 and converted into an electrical signal. This electrical signal is amplified, rectified, log converted and transmitted back to interface circuit 32 of the central control device 30. In the interface circuit the amplitude of the received signal is compared to a reference level. The reference levels are provided by a reference level circuit 37. If the signal is greater than the reference, it is an indication that the amplifier circuits in remote sensor 20 have been saturated because of the amplitude of the detected ultrasonic signal.

The result of the comparison of the received signal with the amplifier saturation reference level is provided to a computer 34 which may be a preprogrammed microprocessor. When the indication is that the remote sensor circuits are saturated, the computer 34 generates a control signal which is sent out over the output line 33 of the current loop to the remote sensor which causes the amplifier in the remote sensor under consideration to reduce its gain. This process is repeated until the remote sensor amplifier is no longer saturated and a true measure of the amplitude of the receive signal can be made.

Once the true amplitude of the ultrasonic signal is calculated on the basis of the gain set in the remote sensor and the receive signal, this value may be compared to an alarm level reference. These references indicate when the ultrasonic signal received has risen above the normal ambient level and the ultrasonic sound received indicates a leak. In addition, a safety level reference can be provided which distinguishes between a small leak, which may be handled by routine maintenance, and a large leak which may indicate that immediate shut-down of the plant, or at least the conduit involved, should be undertaken. Further, the reference level may be calibrated for individual locations, depending on the distance of the transducer from the pipe, the pressure in the pipe, etc. The various calibrated reference levels may be stored in the computer memory for use as needed. If the indication is a small leak, the computer will provide information on the size of the leak and this information can be recorded at recording station 35 and displayed at display station 36. Recording station 35 may be a magnetic tape or disc recorder of conventional design and/or a paper printout. Display may be any of the conventional types of electronic displays, including a cathode ray tube display, liquid crystal display, or other forms of indicator.

By means of a control panel 38, an operator can interrogate the computer 34 about the status of any of the remote sensors 20 and may also take some action with respect thereto. For example, if gas is flowing from conduit 12 into conduit 10, and there is a leak at the junction of conduit 10 and valve 16, the operator may use control panel 38 to alter the position of valve 16 such that the gas in conduit 12 is diverted into conduit 11, thus avoiding the leak. This same selection may be pre-programmed into computer 34 such that the computer, without the intervention of the operator, will cause a change in the valve 16 position. This valve control may be accomplished by a valve control circuit 40 which under the command of computer 34 activates solenoids or motors connected to the valve.

In those instances when the leak is considered of such a minor nature that it can be handled by routine maintenance, the computer can printout a listing of leak locations, which can be utilized by maintenance crews to keep the integrity of the conduit system intact.

A flow chart illustrating the above-described operation of the central control apparatus is provided in FIG. 7. When the system is first turned on it goes through an initialization process (step 700 in FIG. 7) in which its circuits and those of the remote sensors are reset. Power is supplied to the remote sensors and the maximum gain control signal is sent to them so that they will be able to detect the smallest possible leak. Once the remote sensors have been powered, they begin to transmit received ultrasonic signals which are delivered along line 31 to interface circuit 32 (FIG. 1).

In step 702 of FIG. 7 the received signals are compared to gain reference levels from reference circuit 37. In step 704 a determination is made from this comparison as to whether the sensor amplifier is saturated. If it is saturated, the sensor gain is reduced by one step, i.e. by 10 db in process step 705. Then the received signal is again checked to see if it represents a saturated amplifier. This loop is repeated until the sensor amplifier is no longer saturated. Then step 706 is performed. In step 706 the gain set in step 705 and the value of the received signal are checked to see if they indicate that an alarm level, indicating a leak, has been exceeded. Step 708 is the determination of whether this level has been exceeded. If it has not been exceeded the circuit continues to loop through steps 702-708 monitoring for an indication of the leak. Once the ultrasonic level received in the interface circuit does exceed the alarm level reference, step 710 is executed. During step 710 which an alarm is provided. This may be an audio or visual alarm. In addition the location and size of the leak, as determined by the ultrasonic signal and the location of the sensor or sensors from which it is received, is recorded on recording device 35 and displayed at display 36.

If the system is under manual control the operator, using control panel 38, can react to the display of leak information on display 36 and control the plant operation. If, however, the plant operation is at least in part under the control of computer 34, a further comparison is made to see if the size of the leak has produced a signal which exceeds a safety level reference. This is done in step 712. If this level has not been exceeded, the system continues to monitor the leak. However, if it is or becomes greater than the safety level, the plant operation is altered or stopped in step 713. In order to restart the system from step 713, the initialization procedure in step 700 must be repeated. This prevents the system from automatically restarting merely because the leak disappears once the system has shut down.

Figure 2:
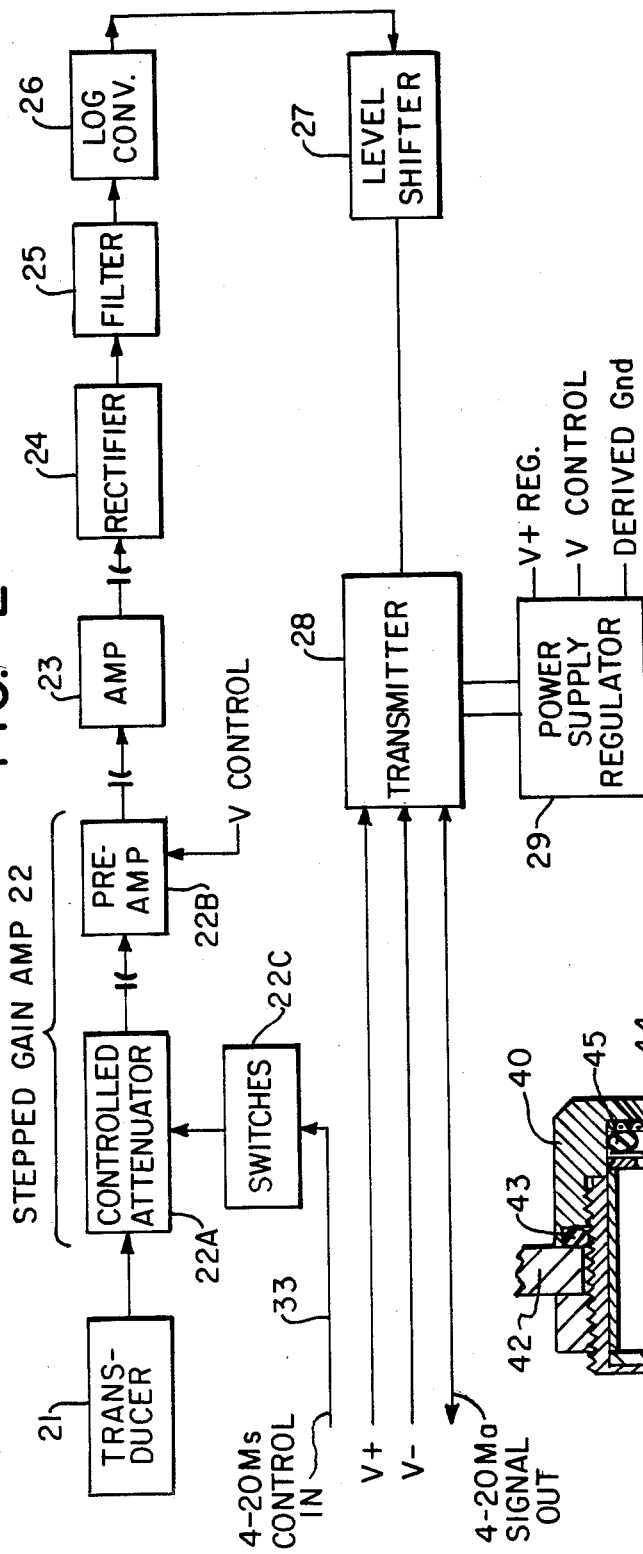
FIG. 2 is a block diagram of the circuitry in a remote sensor portion of the leak detecting system.

FIG. 2 is a block diagram of the electronics in the remote sensor 20. In this circuit the ultrasonic sound signal is picked up by transducer 21 and is converted into an electrical signal applied to stepped gain amplifier 22. The gain of this amplifier is controlled by the 4-20 milliamp control signal from the central control apparatus 30. In the embodiment shown in FIG. 2, the stepped gain amplifier comprises a controlled attenuator 22A in series with a preamplifier 22B. The attenuator 22A is in turn controlled by activation of switches 22C by the 4-20 milliamp input control signal. These switches connect various resistors to the attenuator network, such that the gain through the attenuator changes in 10 db increments. The output of the attenuator is a.c. coupled through a capacitor to preamplifier 22B whose gain can be controlled by a "V-control" voltage level. However, under ordinary circumstances the V-control signal remains constant so that the preamplifier gain does not change from a preset value.

The signal is next a.c. coupled through another capacitor to amplifier 23 and is then a.c. coupled through a further capacitor to active rectifier 24. Rectifier 24 assures that only positive excursions of the ultrasonic signal are passed. This rectified signal is then filtered to produce a d.c. signal level in filter 25. The d.c. filtered voltage level is converted into a logarithm signal in log converter 26 and is then level shifted in level shifter 27. The level shifter circuit 27 merely changes the signal to a reference level which can be handled by a transmitter circuit 28. Transmitter circuit 28 is a current loop transmitter which changes the voltage signal into a current signal for transmission back to the central control circuits over the twisted pair of wires 31, −v, where −v is a voltage input reference line. Transmitter 28 also has a circuit which acts to determine the voltage level generated by regulated power supply circuit 29. Circuit 29 not only converts the plus and minus voltage supplied from the central control circuit into regulated voltages for use by the sensor circuits, it also creates a "derived ground" level for those circuits.

It can be seen that the input over the 4-20 milliamp current loop controls the operation of switches 22C such that the gain of amplifier 22 is reduced to the point that the sensor circuits are not saturated. The signal produced in the unsaturated circuits is then rectified and filtered, log converted and level shifted to provide the output 4-20 milliamp current signal.

Figure 3:
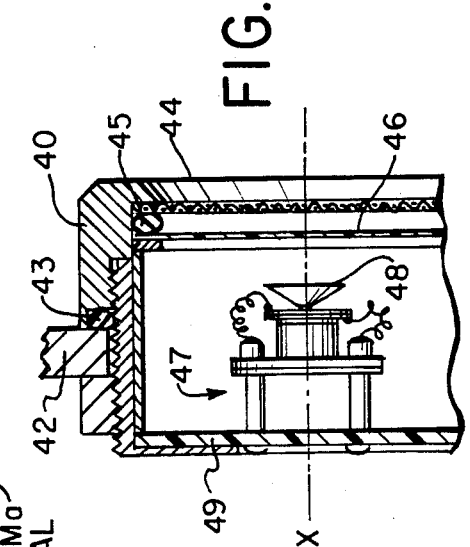
FIG. 3 is a cross-sectional view of a weather resistant ultrasonic detector.
Figure 4B:
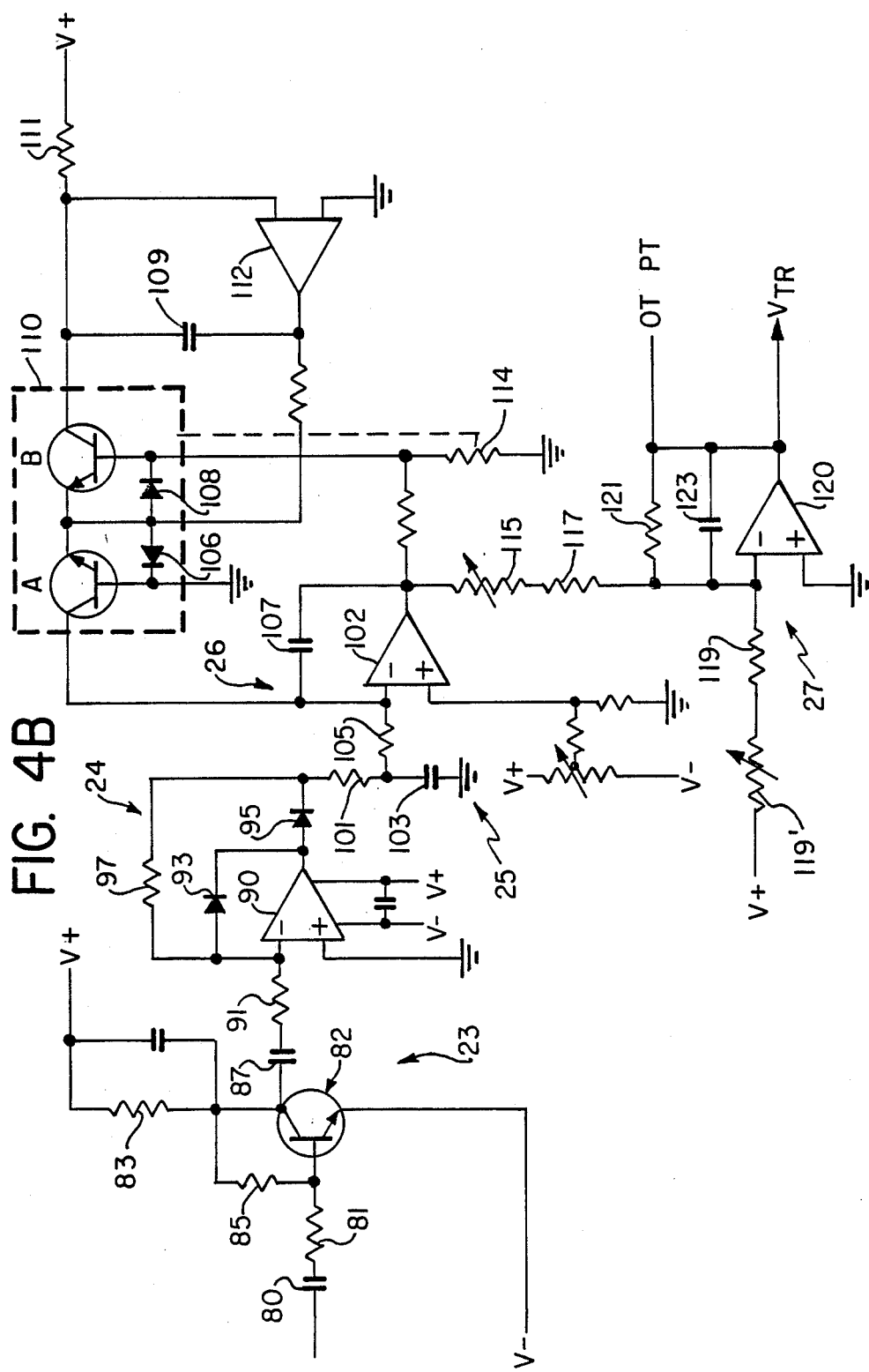
Figure 4C:
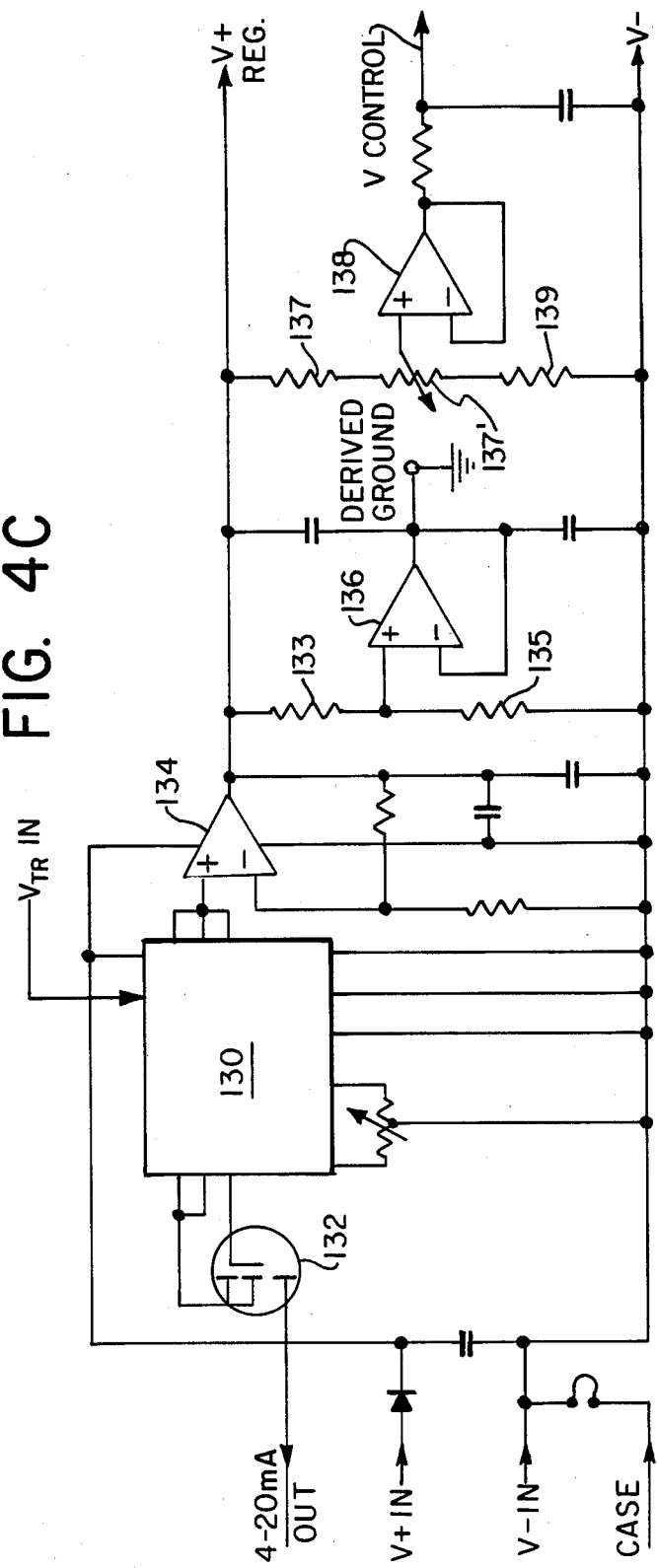

The electronic circuit shown in block form in FIG. 2 is shown in detail in FIGS. 4A, 4B and 4C. As shown in FIG. 4A, the transducer 21 is preferably a series of three transducer elements as described in U.S. Pat. No. 4,416,145 of Goodman et al. Because of the potentially harsh industrial environment where the remote sensors will be located, the transducer assembly is arranged in a specially sealed cylinder as illustrated in FIG. 3. In this arrangement the three transducers are positioned in a cylindrical housing 40 and are aligned with the axis X of the housing. In FIG. 3 only one of the transducer elements on the far side of the X axis can be seen. The other two are spaced about the X axis at 120° angles from the one seen in FIG. 3.

The cylindrical metal housing 40 is retained in one end wall 42 of a closed weather-tight metal container which holds the remaining elements of the remote sensor. An "O"-ring 43 provides a secure seal between the housing 40 and the end wall 42. The other end of the housing is open.

Ultrasonic vibrations are generally received along the axis X through the opening in the cylindrical housing. These vibrations, however, must pass through a metal screen 44 and a sheet of flexible, tough, water resistant material 46, such as a polyester film. One suitable materials is Mylar. Mylar 46, which is electrically conductive, is located over the opening in the housing prior to transducer elements 48. Located between the screen 44 and the Mylar 46 is a further "O"-ring 45 which acts to seal the interior of housing 40 from the external environment. The Mylar completes the covering of the open end of the cylindrical housing so it becomes moisture proof; but allows the ultrasonic vibrations to reach transducers 48 without substantial attenuation. The metal screen 44 and the conductive Mylar barrier, both of which are connected to the metal container at wall 42, attenuate RF interference, while still allowing free passage of the ultrasonic frequencies of interests. Further, screen 44 provides protection to the Mylar against physical impact.

The three transducers, only one of which is shown in FIG. 3, are set on pedestals 47 and are electrically connected to a printed circuit board 49 which is within the container for the sensor electronics.

Returning to FIG. 4A, the a.c. signal from transducer 21, corresponding to the ultrasonic acoustic vibrations received by that transducer, is applied through an attenuator network 22A and a capacitor 70 to the gate of a high-gain field effect, transistor ("FET") 71 of a preamplifier 22B. This a.c. signal voltage is developed across resistor 50 and is applied through resistor 51 to capacitor 70. Resistor 51 is the top of a voltage divider network where the bottom resistors may be any one or more of a combination of resistors 52–55, depending on the activation of any one or more of solid state switches 56–59. The ratio of the resistance of resistors 52–55 to resistance 51 is such that the closing of a respective one or more of switches 56–59 results in step attenuations of 10 db each. In practice the resistors are switched into the network in sequence, i.e. R52, R52+R53, R52+R53+R54 and R52 to R54.

The determination of which of switches 56–59 is closed is made by comparators 61–64 in conjunction with the voltage developed across resistor 66 by the 4–20 milliamp control input signal in conjunction with reference voltages established by the five resistors of voltage divider network 65. The various taps from the voltage divider network 65 are applied to one input of a respective comparator. The other inputs of the comparators are tied together and are connected to resistor 66. Thus, for example, if the control current is sufficient to develop a voltage across resistor 66 which exceeds the reference level applied to comparator 64, that comparator will turn on and produce a signal which activates switch 56. This will provide a particular attenuation factor through attenuator circuit 22b. Should the control input signal be increased in a step manner such that it exceeds the reference level applied to comparator 63, both comparators 63 and 64 will turn on and activate both switches 56 and 57. This causes resistors 52 and 53 to be connected in parallel at the bottom of the resistor divider network that has resistor 51 at its top. Thus, by applying different levels of current as a control input signal, switches 56–59 may be turned on and the gain through attenuator 22B changed in a step manner, for example, 10 db increments.

The 4–20 ma control signal switches between 4, 8, 16, and 20 milliampere levels to provide the five levels of attenuation with a minimum of components. When the control input is at the 4-milliamp level, the value of resistor 66 is such that all of the comparators 61–64 remain untriggered, and have low output levels. In this case the minimum attenuation or maximum gain is achieved. As the input current is stepped to higher levels, the comparators are successively triggered on and the gain through attenuator 22A and preamplifier 22B is decreased. Other means of control are possible. For example, the 4 ma level could be the highest attenuation, if the inverting and non-inverting inputs of the comparator were reversed.

The solid state switches 56–59 can also be manually controlled by dip switches 67, as long as no control current is applied to resistor 66.

In preamplifier 22B, field effect transistor 71 is connected in series with a second field effect transistor 73 by a coupling capacitor 72. These two FETs together make up a high gain, low noise amplifier.

The level "V-control" is a variable voltage which is applied to the source of the FETs. The transconductance of these FETs varies monotonically with this voltage, and thus the gain of the preamplifier is adjustable by varying this voltage. The V-control voltage, however, is normally set at one level and is not changed during normal operation of the system, once it has been calibrated. This voltage is derived from the circuits shown in FIG. 4C.

Resistor 75 references the common terminal of the attenuator network to a "derived ground" potential equal to ½ the potential between V+ and V−. Capacitor 76 provides a.c. signal by-pass to the V− terminal, which is the reference point for the preamplifier 22B. This establishes a "common" reference point between the transducer-attenuator and the preamplifier, while at the same time allowing the transducer-attenuator to operate within the operating limits of the solid state switch. The level "derived ground" is also generated in the circuit shown in FIG. 4C.

The attenuator 22A (whose gain, i.e., attenuation, is controlled by the switches 56–59) and the preamplifier 22B together form a stepped gain amplifier whose signal is a.c. coupled to amplifier 23. The details of amplifier 23, rectifier 24, filter 25, log converter 26 and level shifter 27 are shown in FIG. 4B.

The signal from the output of preamplifier 22B is a.c. coupled through capacitor 80 to the base of transistor 82, which is arranged in the common emitter configuration. Resistors 83 and 85 determine the bias of the transistor amplifier, and resistors 81 and 85 determine the amplifier gain.

The output of amplifier 23 is coupled via capacitor 87 in the inverting input of operational amplifier 90. This operational amplifier functions as a rectifier because of diodes 93 and 95. With a negative voltage supplied at input resistor 91, amplifier 90 produces a positive output whose gain is proportional to the ratio of resistor 97 to resistor 91. This causes diode 95 to be forward biased, thus essentially connecting the amplifier output to resistor 101. However, diode 93 is reverse biased and does not affect circuit operation. When a positive voltage is applied at resistor 91, diode 95 is open so there is no signal transmission, but diode 93 is forward biased so the feedback loop is closed. Thus, negative excursions of the transducer signal at the input to amplifier 90 are passed on to filter 25, but positive excursions are blocked by the rectifier.

Resistor 101 and capacitor 103 form a filter at the output of the rectifier to eliminate a.c. components of the rectified signal. This filtering is assisted by resistor 105 which is the input resistor to the inverting input of operational amplifier 102, which is part of the log converter circuit 26.

The log converter circuit is temperature compensated and uses the logarithmic current-voltage characteristic of the emitter-base junction of dual transistor 110 in order to provide a log output at the output of operational amplifier 102. This output is proportional to the input voltage at resistor 105. In particular, the current through resistor 105 is equal in magnitude to the current that flows through the collector of transistor A of the dual transistor pair 110. This collector current is logarithmically related to the base-emitter voltage of that transistor, thus causing the output of operational amplifier 102 to be proportional to the logarithm of the input voltage at 105. The B transistor of transistor pair 110 is supplied with current from resistor 111, which current is fixed. This B transistor is also in the feedback loop of a matching operational amplifier 112. The purpose of the B section transistor is to provide temperature compensation for the A section transistor. The operational amplifier 102 and the A section transistor are matched by operational amplifier 112 and the B section transistor such that the two cancel each other with respect to temperature variations. Only the difference in input currents shows up at the output. Resistor 114, which is connected to the base of transistor B is a temperature sensitive resistor which compensates for the fact That the $V_{BE}$ versus $I_C$ slope at a particular temperature for the transistors 110, differs depending on the current through those transistors, and the two transistors A, B will normally operate at different currents.

Capacitor 107 around amplifier 102 and capacitor 109 around amplifier 112 are necessary to stabilize the feedback loop since the transistors 110 contribute voltage gain inside the loop. Diodes 106 and 108, which are connected across the base emitter junctions of transistors 110, are necessary to prevent base emitter breakdown of these transistors in the event the input voltage goes negative, since the transistors provide no feedback path for positive operational amplifier output voltages.

The output of this log converter circuit is taken at the output of amplifier 102. This output signal is now the log of the rectified ultrasonic signal. The log of the signal is used because it is conventional in acoustic signal measurement to express levels in "db", which is a logarithmic function of the signal level. Further, this allows a larger dynamic range to be represented with greater accuracy by the 4-20 ma output transmission system.

The log signal is applied through resistors 115, 117 to the inverting input of operational amplifier 120 of level shift circuit 27. The purpose of level shift circuit 27 is to shift the log output signal, which is referenced to a derived ground, to a level which is referenced to V− so as to match the required input level of the current transmitter integrated circuit 130 in FIG. 4C. This level shifter also scales the signal for excursions appropriate to the input range of the transmitter.

A bias current is applied to the inverting input of amplifier 120 through resistor 119, 119′, resistor 119′ being adjustable. This current is summed with the current representing the log output signal at the inverting input of amplifier 120. The gain of a circuit for the log signal is controlled by the ratio of the resistor 117 to feedback resistor 121 which connects the input and output of amplifier 120. Capacitor 123 is located across resistor 121 and serves to provide a low pass filtering of the output signal, thereby reducing ripple voltage.

By adjusting resistor 19′, the level is shifted. In particular the off-set is given by $$V_{off} = -\tfrac{1}{2} V + \text{Reg} (R119' + R119)).$$

Further the signal is scaled by the factor $$G = -(R121/(R115 + R117))$$

by adjusting resistor 115.

The scaled and level shifted logarithmic signal is applied to the input of the current loop transmitter integrated circuit 130 of transmitter circuit 28 as shown in FIG. 4C. Transmitter 130 is a precision voltage-current convertor transmitter, for example of the type sold by Burr-Brown Corporation as model XTR 110. It converts the voltage input from the level shifter into a 4-20 milliamp current loop signal. This circuit also includes a precision +10 volt reference level.

The output 4-20 milliamp signal is delivered from transmitter 130 through a MOSFET transistor 132. The use of the external transistor 132 keeps heat outside of the transmitter integrated circuit 130 and optimizes performance under all output conditions.

The regulated voltage level generated in transmitter 130 is applied to the non-inverting input of an operational amplifier 134. The output of this amplifier is the V+ regulated voltage for the electronics in the remote sensor. This voltage is with respect to the V− input level from the central control and analysis circuit.

A futher operational amplifier 136 is connected in a follower arrangement to the junction between resistors 133 and 135, which are arranged between the +V regulated and the minus voltage, such that it is essentially at zero voltage. The output of amplifier 136 is the "derived ground" used throughout the electronics in the remote sensor.

Operational amplifier 138 is arranged in a similar configuration to amplifier 136, using resistors 137, trimpot 137′ and resistor 139. The output of amplifier 138 is the "V control" signal which controls the gain of preamplifier 22B. The level of the V control voltage is adjusted by adjusting trimpot 137′.

Figure 5:
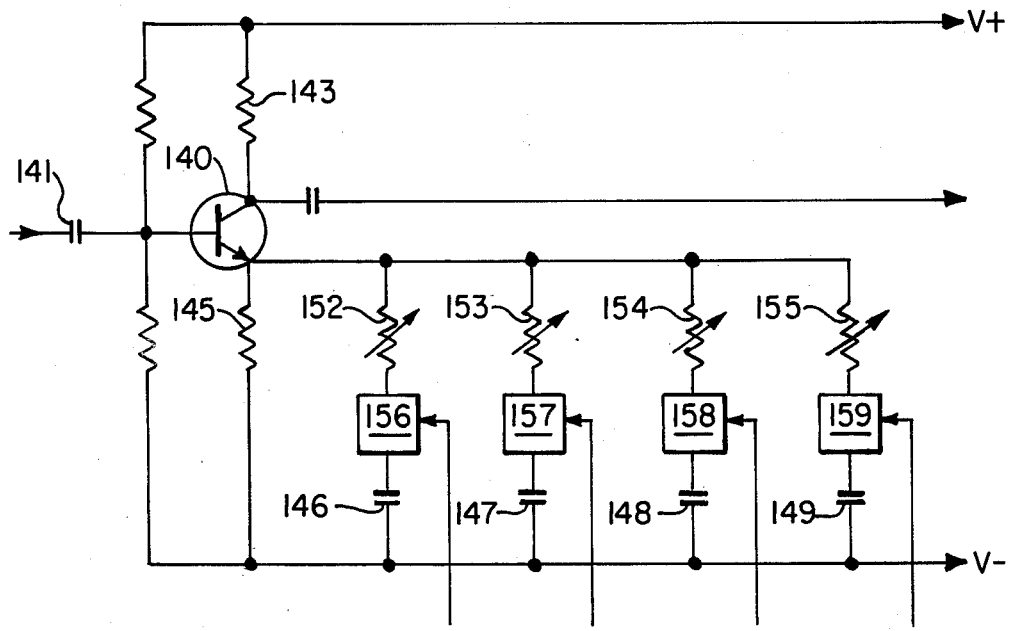
FIG. 5 is a schematic diagram of an alternative stepped-gain amplifier for the remote sensor.
Figure 6:
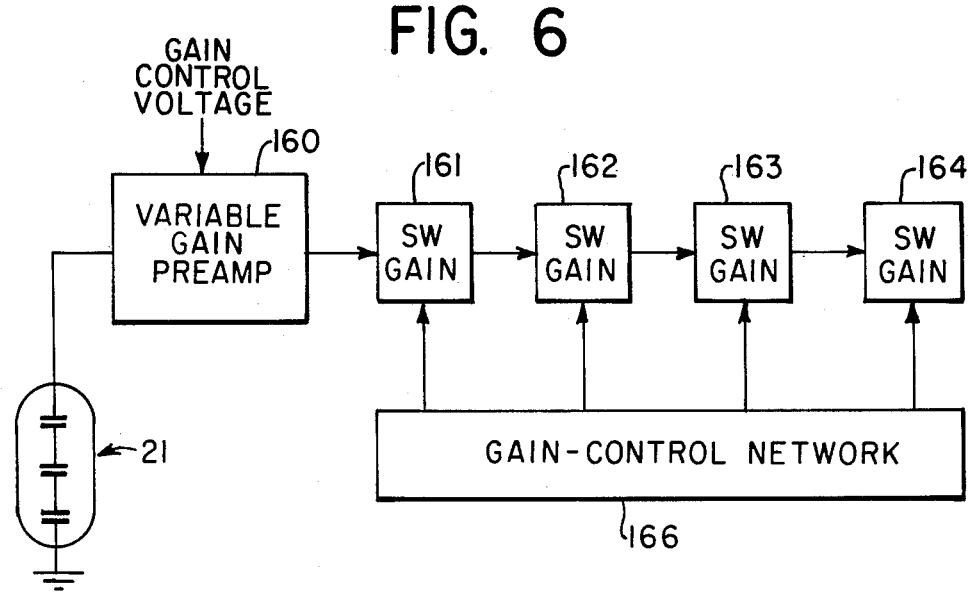
FIG. 6 is a schematic diagram of a further alternative stepped-gain amplifier for the remote sensor.

The stepped gain amplifier 22 shown in FIG. 4A has a stepped attenuator section followed by a field-effect transistor preamplifier. This arrangement can be changed as shown in FIG. 5 to incorporate the stepped attenuator in the preamplifier itself. In FIG. 5 the ultrasonic signal from the transducer 21 is applied through capacitor 141 to the base of transistor 140. Resistors 143 and 145 set the nominal gain of the amplifier at the output of the collector of transistor 140. However, in parallel with the emitter resistor 145, is a resistor 152 in series with an electronic switch 156 and a capacitor 146. When the switch is activated, for example by a group of comparators such as comparators 61–64 shown in FIG. 4A, the resistor 152 is put in parallel with resistor 145, thus increasing the gain of the amplifier. Resistors 157–159 and switches 157–159 are also connected in parallel with resistor 145. The capacitors 146–149 in series with the switches in FIG. 5, allow the realization of the increased gain only for signals high enough in frequency to be considered in the ultrasonic region. If the switches 156–159 are sequentially activated the gain of the circuit increases in fixed steps which can be arranged to be 10db increments A further alternative arrangement shown in FIG. 6 has the output of transducer 21 coupled directly to a preamplifier 160, such as that shown in FIG. 4A, without the intervention of the stepped attenuator. The output of the field-effect transistor preamplifier is then passed through switched gain stages 161–164. The circuits 161–164 may be passive attenuators with fixed gain reductions or active circuits with fixed gain increases. Further, the input preamplifier, like that shown in FIG. 4A, can be arranged with a variable gain control input, such that the preamplifier gain is adjustable.

Each stage 161–164 may be an amplifier such as that in FIG. 5. As a result each stage may have two levels of gain controlled by one resistor and one switch, e.g. resistor 152 and switch 156. However, it may also have multiple gain levels controlled by multiple resistors and switches.

As a still further alternative arrangement, the precision rectifier, log converter and level shifter circuits may be replaced with an RMS converter circuit with a log output. An example of such an RMS converter is the one made by Analog Devices as model AD536A. This RMS converter could be followed with a commercially available log converter. The advantages of this type of circuit is that the true RMS output signal would be provided. Further, there would be simple overall circuit configuration. However, the disadvantage is the greater expense of such integrated circuit devices.

While the invention has been particularly shown and described with reference to preferred embodiments thereof, it will be understood by those skilled in the art that various changes in form and details may be made therein without departing from the spirit and scope of the invention.

We claim:

1. A remote ultrasonic sensor and control system comprising:
    at least one remote ultrasonic sensor means for detecting ultrasonic vibrations in its vicinity and converting them into an electrical signal, said sensor means having a variable gain which can be changed in discrete steps according to a control signal;
    a central control means for analyzing the electrical signal from the sensor means and for generating the control signal for the sensor means; and
    a current loop transmission means connecting said sensor means and central control means, said current loop transmission means including a first current loop continuously delivering the control signals to said sensor means as discrete current levels and a second current loop continuously delivering the electrical signal from said sensor means as a current level.

2. A remote ultrasonic sensor and control system as claimed in claim 1 wherein there are a plurality of sensor means spaced from each other and said central control means, said transmission means connecting each sensor means to the central control means.

3. A remote ultrasonic sensor and control system as claimed in claim 1 wherein the sensor means includes an ultrasonic transducer and a stepped gain amplifier whose gain is controlled by the control signal.

4. A remote ultrasonic sensor and control system as claimed in claim 3 wherein the stepped amplifier comprises:
    a variable gain amplifier connected to said transducer;
    at least one switched gain stage with at least two states, the gain of said switched gain stage being lower in one state than in the other, said switched gain stage being in series with said variable gain amplifier; and
    means for controlling the state of said switched gain stage in response to the control signal.

5. A remote ultrasonic sensor and control system as claimed in claim 1 wherein said current loop transmission means includes voltage-to-current converters located at said central control means and at said sensor means, said converters being connected by twisted pairs of wires extending up to 2,000 feet.

6. A remote ultrasonic sensor and control system as claimed in claim 5 wherein the voltage-to-current converter at said central control means provides the control signals in the form of incremental current levels of substantially 4, 8, 12, 16 and 20 milliamperes.

7. A remote ultrasonic sensor and control system comprising:
    at least one remote ultrasonic sensor means for detecting ultrasonic vibrations in its vicinity and converting them into an electrical signal, said sensor means having a variable gain which can be changed in discrete steps according to a control signal;
    a central control means for analyzing the electrical signal from the sensor means and for generating the control signal for the sensor means, the sensor means includes an ultrasonic transducer and a stepped gain amplifier whose gain is controlled by the control signal, the stepped gain amplifier has (i) an effective resistance in series with one end of the transducer and providing a signal from the transducer to the input of the amplifier, (ii) at least one series-connected resistance and switch connected between the input of the amplifier and the other end of the transducer, (iii) a source of at least one reference voltage; and (iv) at least one comparator for comparing the control signal to the one reference voltage and for producing an output in response to the comparison, the output of said comparator controlling the actuation of the switch of said series-connected resistance and switch; and
    a current loop transmission means connecting said sensor means and central control means, said current loop transmission means delivering the control signals to said sensor means as discrete current levels and receiving the electrical signal from said sensor means as a current level.

8. A remote ultrasonic sensor and control system as claimed in claim 7 wherein said effective resistance is the internal resistance of said transducer.

9. A remote ultrasonic sensor and control system as claimed in claim 7 wherein there are
    a plurality of series-connected resistances and switches, each series-connected resistance and switch being connected in parallel from the input to the amplifier to the other end of said transducer,
    a plurality of reference voltages of increasing amplitude, and
    a plurality of comparators, each comparator comparing a separate reference voltage to the control signal and controlling the activation of a separate switch.

10. A remote ultrasonic sensor and control system comprising:
    at least one remote ultrasonic sensor means for detecting ultrasonic vibrations in its vicinity and converting them into an electrical signal, said sensor means having a variable gain which can be changed in discrete steps according to a control signal;
    a central control means for analyzing the electrical signal from the sensor means and for generating the control signal for the sensor means, the sensor means includes an ultrasonic transducer and a stepped gain amplifier whose gain is controlled by the control signal, the stepped gain amplifier has (i) a transistor connected with a first resistor and a second resistor, the output of the stepped amplifier being at the connection of the transistor to the first resistor, and the gain through said transistor being related to the ratio of the resistance values of the first and second resistances, (ii) at least one series-connected resistance and switch located in parallel with the second resistance, (iii) a source of at least one reference voltage, and (iv) at least one comparator for comparing the control signal to the one reference voltage and producing an output in response to the comparison, the output of said comparator controlling the activation of the switch of said series-connected resistance and switch; and a current loop transmission means connecting said sensor means and central control means, said current loop transmission means delivering the control signals to said sensor means as discrete current levels and receiving the electrical signal from said sensor means as a current level.

11. A remote ultrasonic sensor and control system as claimed in claim 10 wherein there are a plurality of series-connected resistances and switches, each series-connected resistance and switch being connected in parallel across the second resistance, a plurality of reference voltages of increasing amplitude, and a plurality of comparators, each comparator comparing a separate reference voltage to the control signal and controlling the activation of a separate switch.

12. A remote ultrasonic sensor and control system comprising:

at least one remote ultrasonic sensor means for detecting ultrasonic vibrations in its vicinity and converting them into an electrical signal, said sensor means having a variable gain which can be changed in discrete steps according to a control signal;

a central control means for analyzing the electrical signal from the sensor means and for generating the control signal or the sensor means, the sensor means includes an ultrasonic transducer and a stepped gain amplifier whose gain is controlled by the control signal, the stepped amplifier is a field effect transistor with a drain resistor, a voltage applied to the drain resistor acting to control the gain of the amplifier, and means for varying the voltage applied to the drain resistor in response to changes in the control signal; and a current loop transmission means connecting said sensor means and central control means, said current loop transmission means delivering the control signals to said sensor means as discrete current levels and receiving the electrical signal from said sensor means as a current level.

13. A remote ultrasonic sensor and control system comprising:

at least one remote ultrasonic sensor means for detecting ultrasonic vibrations in its vicinity and converting them into an electrical signal, said sensor means having a variable gain which can be changed in discrete steps according to a control signal;

a central control means for analyzing the electrical signal from the sensor means and for generating the control signal for the sensor means, the sensor means includes an ultrasonic transducer and a stepped gain amplifier whose gain is controlled by the control signal, the stepped amplifier has (i) a variable gain amplifier connected to said transducer, (ii) a plurality of switched gain stages with at least two states, the gain of said switched gain stages being lower in one state than in the other, said switched gain stages being in series with each other and said variable gain amplifier, and (iii) means for controlling the state of each stage of said switched gain stages in response to particular levels of the control signal; and a current loop transmission means connecting said sensor means and central control means, said current loop transmission means delivering the control signals to said sensor means as discrete current levels and receiving the electrical signal from said sensor means as a current level.

14. A remote ultrasonic sensor and control system as claimed in claim 13 wherein each switched gain stage contains at least one series connected resistor and switch, activation of the switch acting to connect the resistor in the stage and to change its gain.

15. A remote ultrasonic sensor and control system as claimed in claim 14 wherein each switched gain stage contains a plurality of series connected resistors and switches.

16. A remote ultrasonic sensor and control system comprising:

at least one remote ultrasonic sensor means for detecting ultrasonic vibrations in its vicinity and converting them into an electrical signal, said sensor means having a variable gain which can be changed in discrete steps according to a control signal;

a central control means for analyzing the electrical signal from the sensor means and for generating the control signal for the sensor means, the sensor means includes (i) an ultrasonic transducer, (ii) a stepped gain amplifier whose gain is controlled by the control signal, (iii) a rectifier means for converting the output of the stepped gain amplifier into a d.c. level, and (iv) a log converter means for converting the d.c. level from said rectifier means into a log d.c. level signal whose value is the logarithm of the value of the d.c. level from said rectifier means, the log d.c. level signal being transmitted to said central control means by said current loop transmission means; and a current loop transmission means connecting said sensor means and central control means, said current loop transmission means delivering the control signals to said sensor means as discrete current levels and receiving the electrical signal from said sensor means as a current level.

17. A remote ultrasonic sensor and control system comprising:

at least one remote ultrasonic sensor means for detecting ultrasonic vibrations in its vicinity and converting them into an electrical signal, said sensor means having a variable gain which can be changed in discrete steps according to a control signal;

a central control means for analyzing the electrical signal from the sensor means and for generating the control signal for the sensor means, said central control means including (i) a source of signal reference levels, (ii) means for comparing the electrical signals received from the sensor means to one of the reference levels to determine if the sensor is saturated by an ultrasonic signal which is too large for its gain, (iii) means for incrementally adjusting the control signal to the sensor to reduce the gain at the sensor, whenever it is determined that the sensor is saturated, and (iv) means for analyzing the control signal and the received electrical signal to determine the magnitude of the ultrasonic vibrations detected by said sensor means and for providing a first indication signal whenever the magnitude exceeds a first predetermined value.

a current loop transmission means connecting said sensor means and central control means, said current loop transmission means delivering the control signals to said sensor means as discrete current levels and receiving the electrical signal from said sensor means as a current level.

18. A remote ultrasonic sensor and control system as claimed in claim 17 wherein the means for analyzing includes a programmed microprocessor.

19. A remote ultrasonic sensor and control system as claimed in claim 17 wherein said central control means further includes:
   means for recording the magnitude of the ultrasonic signal; and
   means for displaying at least one of (i) the magnitude of the ultrasonic signal and (ii) the indication signal.

20. A remote ultrasonic sensor and control system as claimed in claim 17 wherein
   the sensor is located adjacent apparatus which produces ultrasonic vibrations in the event of faulty operation of said apparatus; and
   further including means for changing the operation of the apparatus.

21. A remote ultrasonic sensor and control system as claimed in claim 20 wherein
   said apparatus is a pressurized conduit and said means for changing is a means for diverting pressure therefrom; and
   said central control further includes a control panel for manual operation of said means for diverting.

22. A remote ultrasonic sensor and control system as claimed in claim 21 wherein
   said means for analyzing includes means for providing a second indication signal whenever the magnitude of said vibrations exceeds a second predetermined value greater than the first predetermined value; and
   said central control system includes a computer which operates said means for diverting in response to said second indication signal.

* * * * *